Oct. 18, 1949.   W. DZUS ET AL   2,485,531

SURGICAL TOGGLE BOLT

Filed Jan. 13, 1948

INVENTOR
William Dzus
George S. King

ATTORNEY

Patented Oct. 18, 1949

2,485,531

UNITED STATES PATENT OFFICE 2,485,531

SURGICAL TOGGLE BOLT

William Dzus, West Islip, and George S. King, Bay Shore, N. Y.

Application January 13, 1948, Serial No. 1,958

2 Claims. (Cl. 128—92)

This invention relates to an improved surgical toggle bolt which is particularly useful in orthopedic surgery.

In retaining and correcting certain types of bone fractures, dislocated joints, spread mortises and the like, metallic screws and fasteners have been employed. Screws have the disadvantage that the material of the bone to which they are applied frequently does not provide adequate support and the threads formed in the bone are stripped. To meet this difficulty, it is desirable to have a fastening which will extend either through one side of the bone shell to the medullary canal or hollow center portion or through the entire bone and be secured at the opposite side. Since the opposite side or the medullary canal is generally not accessible and since it is undesirable to cut too much bone or tissue away, it is desirable that such a fastening be a blind fastening which can be inserted from one side of the bone and can then be engaged or secured either at the opposite side of the entire bone or the opposite side of one-half section thereof in the medullary canal.

It is an object of the present invention to provide an improved toggle bolt fastener for use in orthopedic surgery which is suitable for the purposes above indicated and which can be readily installed from one side of the bone and which can be so controlled that it will be secured either on the opposite side of the bone or in the medullary canal.

Our improved device has the advantages that it is easy to install, that it can be readily controlled while being installed, that the fastening or securing means can be readily rendered operative when desired and that after it is installed, it will afford positive and secure fastening of the parts.

In the accompanying drawing:

Fig. 4 is a side elevational view of a portion of a bone showing two of the toggle bolts;

Fig. 5 is a view from the right end of Fig. 4;

Figure 1:
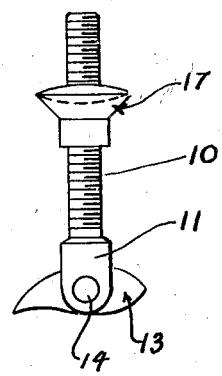
Fig. 1 is a side elevational view of a toggle bolt embodying our invention showing the locking arm in operative or locked position.
Figure 3:
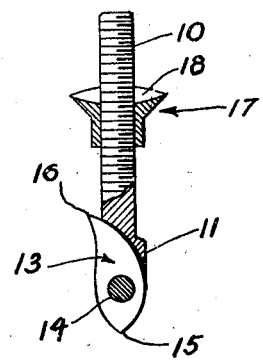
Fig. 3 is a partially sectional elevational view similar to Fig. 1, but with the locking arm in retracted or unlocked position.
Figure 2:
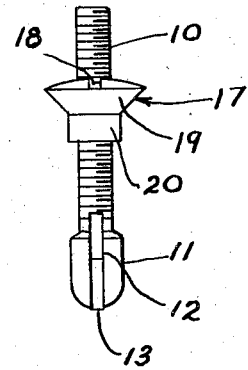
Fig. 2 is an elevational view at right angles to Fig. 1.

Referring to the first form of our invention, our toggle bolt consists generally of a threaded stud 10 having an enlarged head 11 at the lower or leading end thereof. The head is rigidly attached to the stud and is provided with a longitudinal slot 12 in which is pivotly mounted a locking arm 13 by means of cross pin 14. The locking arm 13 is supported slightly nearer one end than the other, as shown most clearly in Fig. 3. The one end, which is the leading end when the arm is in retracted position as shown in Fig. 3, is provided with a relatively blunt point 15. The opposite or trailing end 16 comes to a relatively sharp point and is curved or hooked to one side, i. e. the left side as viewed in Fig. 3. When in retracted position, the hooked pointed end 16 projects laterally from the side of the head end of the stud and this projecting portion facilitates the shifting of the arm to transverse locking position.

A suitable threaded nut or retainer, as shown at 17, is applied at the opposite end of the stud. The form of nut shown in the first form of our invention has a kerf or screw driver slot in its upper surface, as shown at 18, and has a tapered lower surface 19 terminating in a collar 20.

The toggle bolt is useful for many different purposes, particularly for retaining bone fractures, spread mortises, joint dislocations and the like. In Figs. 4 and 5 I have illustrated the device in one type of installation for retaining a bone fracture. In these figures, a portion of a fractured bone is indicated at 21 and the fracture is shown at 22. One side or section of the bone has been drilled through at 23 and 24 and an apertured metal plate 25 has been placed against the outer surface of the bone straddling the fracture and with the apertures in registry with the drilled holes in the bone. A toggle bolt of sufficient length is selected and the locking arm 13 is shifted to the retracted position shown in Fig. 3. The retainer or nut may be applied to the stud but should be spaced sufficiently from the locking arm to permit the insertion of the stud with the head and locking arm projecting beyond the point of engagement. With the locking arm in retracted position, the head is inserted through the plate and through the drilled aperture 23 in the manner indicated in the left hand side of Fig. 4 until the head and all of the locking arm 13 are inside the bone in the medullary canal. The stud is then manipulated so that the trailing end 16 is engaged against the surface of the inner shell of the bone and the locking bolt is partially withdrawn so that the locking arm 13 is shifted to transverse operative position. Stud 10 is then pulled outwardly so as to cause frictional engagement between the locking arm and the inner surface of the shell of the bone, and thereby preventing rotation thereof while the retainer or nut 17 is tightened.

When the nut has been fully tightened, the projecting outer end of stud 10 may be severed at the upper surface of the retainer as shown in Fig. 5 and at the right hand side of Fig. 4.

The installation and tightening of the toggle bolt may be simplified by using the tool shown in Figs. 6 and 7 hereinafter described.

When the toggle bolts have been applied in the manner described, it will be seen that they are firmly secured in position and that they will retain the refracture against separation. The toggle bolt is not dependent upon threads formed in the bone material but instead is firmly held in place by fastening means engaging both surfaces of the bone or of the bone shell.

Our surgical toggle bolt may also be used without a plate, such as shown at 25, and also may be extended completely through the bone rather than merely through to the medullary canal. Thus, in Figs. 6 and 7 I have shown a somewhat modified type of toggle bolt consisting of a relatively more elongated stud 30 having a slot at head 31 in the leading end thereof in which a locking arm 33 is pivoted.

The locking arm 33 is similar in all respects to locking arm 13. A threaded retainer or nut 37 having an oval head and depending collar is illustrated as applied to the trailing end of the stud.

In this form of our invention we have shown a control or guide wire 38 suitably secured to the pointed trailing end of the locking arm 33. The control or guide wire is used to hold the locking arm in retracted position as it is inserted through the bone structure. This arrangement is particularly useful where it is desired to extend the toggle bolt completely through the bone from one side to the other as it prevents the locking arm from opening in the center section of medullary canal of the bone.

Figures 6, 7:
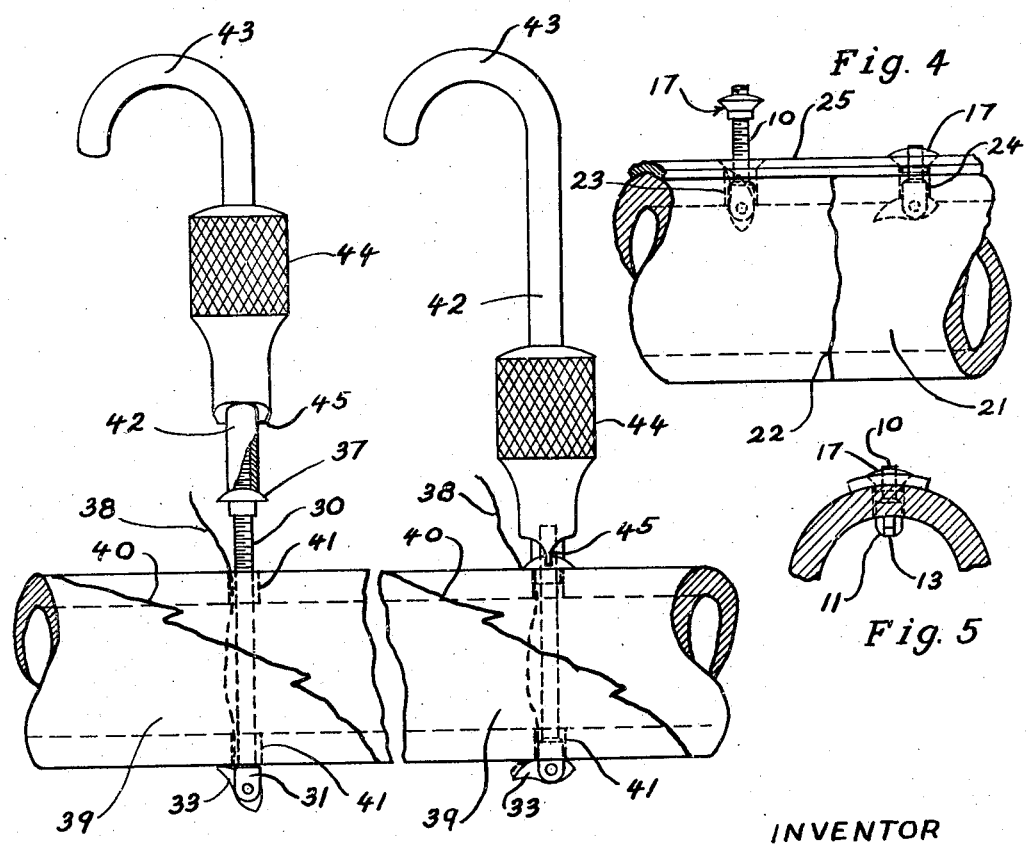
Fig. 6 is a side elevational view showing a slightly modified type of toggle bolt being applied to a bone by a simple tool which facilitates the installation.
Fig. 7 is a view similar to Fig. 6 showing the modified type of toggle bolt fully applied.

In Figs. 6 and 7 we have illustrated the fastener as being installed without a plate for the purpose of retaining a bone fracture. The bone is indicated at 39 and the fracture at 40. When used in this manner the bone is drilled through as shown at 41 and the locking arm 33 is shifted to unlocked or retracted position and the toggle bolt is then inserted through the drilled aperture. The guide or control wire 38 is pulled taut while the toggle bolt is being inserted so as to prevent accidental release or opening thereof.

After the head and locking arm have been inserted completely through the bone, the curved pointed trailing end of the locking arm is engaged with the surface of the opposite side of the bone, the tension on the control wire is released and the stud is partially withdrawn causing the locking arm to gradually open in the manner indicated in Fig. 6 until it is fully open, engaging the outer surface of the bone on opposite sides of the drilled aperture as shown in Fig. 7. The retainer or nut is then tightened and the projecting end of the stud may be cut or severed as previously described.

The installation and application of the toggle bolt may be facilitated by means of the tool shown in Figs. 6 and 7. This tool consists of a tubular internally threaded shank 42 having a hooked handle 43 at the upper end thereof and having a sleeve-like screw driver 44 with a knurled handle applied thereto so that it may shift longitudinally thereon. The lower end of the screw driver is provided with the usual driver portion 45 for engagement with a kerf or slot in the retainer.

In using the tool, it is threaded to the upper portion of the stud 30 and brought into tight engagement with the retainer 37. The toggle bolt is thus held against turning movement by the tool and can be readily manipulated thereby. The tool is used to insert the toggle bolt through the bone, and it can be guided and the locking arm 33 can be readily held at any relative rotary position. In this connection, the tool may be assembled with the toggle bolt in such a manner that the kerf in the retainer is parallel with the locking arm, and in this manner the relative position of the locking arm can always be determined even when it is inside the bone.

After the toggle bolt has been fully inserted and the locking arm released to operative position, the operator applies tension on the hook 43, causing the locking arm 33 to frictionally engage the bone and thereby holding the toggle bolt against rotation. Screw driver 44 can then be rotated to tighten the retainer or bolt 37. When the retainer has been tightened, the tool can be unscrewed from the projecting end of the stud and the projecting end can then be severed at the upper surface of the retainer.

The improved toggle bolt and associated parts are preferably made of a metal inert to body fluids, such as stainless steel.

It will thus be seen that we have provided an improved surgical toggle bolt, particularly for use in orthopedic surgery. The toggle bolt is relatively simple in construction, is easy to install, provides positive fastening or gripping and does not require access to the other side of the bone for its installation.

Modifications may, of course, be made in the illustrated embodiments of our invention without departing from our invention as set forth in the accompanying claims.

We claim:

1. A toggle bolt for use in bone surgery comprising a stud having a longitudinally slotted portion at the leading end and a locking arm pivotly mounted in the slot, the pivotal mounting being a spaced distance from the base of the slot and at an intermediate portion of the locking arm so that the locking arm is shiftable between locked position extending substantially transversely of the stud with its two ends projecting beyond the sides of the stud and unlocked position extending substantially parallel to the stud with the major portion thereof contained within the slot, the end of the locking arm which is the trailing end when in unlocked position being provided with a laterally curved offset portion which projects laterally beyond the side of the stud in unlocked position to facilitate shifting of the arm to locked position.

2. A toggle bolt for use in bone surgery comprising a stud having a threaded shank and a longitudinally slotted head at the leading end thereof and a locking arm pivotly mounted in the slot, the pivotal mounting being a spaced distance from the base of the slot and at an intermediate portion of the locking arm and slot extending more deeply into the stud on one side than on the other so that the locking arm is shiftable between locked position extending substantially transversely of the stud with its two ends projecting beyond the sides of the stud and unlocked position extending substantially parallel to the stud with the major portion thereof retained in the slot, the end of the locking arm which is the trailing end when in unlocked position being provided with a laterally curved relatively sharp point projecting laterally beyond the side of the stud in unlocked position to facilitate shifting of the locking arm to locked position and the opposite end of the arm being provided with a relatively blunt rounded point projecting beyond the leading end of the stud when in unlocked position.

WILLIAM DZUS.
GEORGE S. KING.

REFERENCES CITED

The following references are of record in the file of this patent:

UNITED STATES PATENTS

| Number | Name | Date |
|---|---|---|
| 624,969 | Peterson | May 16, 1899 |
| 1,269,912 | Dunham | June 18, 1918 |
| 2,077,804 | Morrison | April 20, 1937 |

FOREIGN PATENTS

| Number | Country | Date |
|---|---|---|
| 376,911 | France | Jan. 25, 1907 |